United States Patent [19]

Asperger et al.

[11] 4,143,119

[45] Mar. 6, 1979

[54] METHOD AND COMPOSITION FOR INHIBITING THE CORROSION OF FERROUS METALS

[75] Inventors: Robert G. Asperger, Midland, Mich.; Leroy S. Krawczyk; Billy D. Oakes, both of Lake Jackson, Tex.

[73] Assignee: The Dow Chemical Company, Midland, Mich.

[21] Appl. No.: 807,089

[22] Filed: Jun. 16, 1977

Related U.S. Application Data

[63] Continuation-in-part of Ser. No. 648,620, Jan. 12, 1976, abandoned.

[51] Int. Cl.$^2$ .............................................. B01D 53/34
[52] U.S. Cl. ................................. 423/226; 423/228; 423/229; 423/232; 252/189; 252/389 R; 252/390
[58] Field of Search ............... 423/210, 220, 224, 228, 423/229, 232, 233, 561; 252/387, 389 R, 390, 189

[56] References Cited

U.S. PATENT DOCUMENTS

| | | | |
|---|---|---|---|
| 1,989,004 | 1/1935 | Fife | 423/228 |
| 2,405,672 | 8/1946 | Reitmeier | 423/224 |
| 2,559,580 | 7/1951 | Alexander | 423/228 |
| 3,372,981 | 3/1968 | Ravner et al. | 423/229 |
| 3,932,583 | 1/1976 | Schievelbein | 423/232 |

*Primary Examiner*—Earl C. Thomas
*Attorney, Agent, or Firm*—G. R. Baker

[57] ABSTRACT

A copper based corrosion inhibitor composition and a method for employing the same to prevent corrosion of metal in contact with acid-gases, i.e., hydrogen sulfide, carbonyl sulfide and carbon dioxide. Copper, or a copper compound and sulfur or a sulfur compound, is maintained in solution in contact with the metal under conditions of operation, particularly the thermal regeneration, which provide copper ions and sulfur atoms, particularly polysulfide moieties at the surface of the metal, e.g. copper sulfide is dissolved in an aqueous alkanolamine, monoethanolamine, solution used as an absorbent for acid-gas removal from sour-gas. The copper and sulfur moieties may be formed in situ or prepared and added in solution. The inhibitor has particular utility in protecting metal surfaces which are subject to corrosion as an incidence of the acid-gas content of either natural or synthetic gases.

10 Claims, No Drawings

METHOD AND COMPOSITION FOR INHIBITING THE CORROSION OF FERROUS METALS

CROSS REFERENCE TO RELATED APPLICATION

This application is a continuation-in-part of our co-pending application Ser. No. 648,620 filed Jan. 12, 1976, and now abandoned.

BACKGROUND OF INVENTION

The conditioning (sweetening) of gases, natural and synthetic, i.e., acid gas stripping, the removal of acidic gases, e.g., $CO_2$, $H_2S$ and COS, by absorption of the acidic gases in a liquid absorbent medium, has been practiced commercially for many years. Various absorbents, such as the alkanolamines, "sulfolane" (tetrahydrothiophene-1,1-dioxide), "sulfinol" (tetrahydrothiophene-1,1-dioxide plus diisopropanolamine), potassium carbonate and the like, have been used commercially. Each of these systems is plagued by corrosion problems, some of which result from decomposition of the absorbent, some from reaction between the acidic components of the gases treated and the absorbent, and all, to more or less the same degree, from attack by the acidic components of the gases treated upon the metals of construction of the equipment. Generally, the corrosion occurs in the regenerator, heat exchangers, pumps and piping associated with these elements of the overall equipment. Numerous compounds have been suggested as additives to the absorbents to prevent the corrosion and/or the formation of corrosive elements. For example, copper sulfate was used for three years in a 15 percent monoethanolamine gas processing plant for removing 10 percent $CO_2$ from the gas. Corrosion was observed as a decrease in reboiler and heat exchange tube life and on analysis of the amine solution, only a few parts per million copper was found thus indicating excessive copper deposition in the unit. (Gas Conditioning Fact Book, The Dow Chemical Company, Midland, Mich. 1962, pp. 157-158, Case Number 8). In another situation, described in U.S. Pat. No. 2,377,966, copper sulfate or copper carbonate in an aqueous alkanolamine solution was used as the absorbent to remove $CO_2$ from a gas stream in which no $H_2S$ was present. The copper compound in the absence of any $H_2S$ was used to reduce the iron content of the solution (iron content being a measure of the oxidation of the solution and metal) thus indicating a reduction in the corrosivity of the solution to iron. The alkanolamine with the absence of $H_2S$ reacted in the presence of the copper to yield oxalic acid after going through aminoacetic acid, which apparently is a product of the oxidation of the amine in the presence of iron. In still a further literature, reference, U.S. Pat. No. 2,771,405, copper corrosion by sulfur compounds and/or free-sulfur is reduced by solvent extracting the petroleum distillates with aqueous alkanolamine to remove the sulfur. Thus, in practice, copper has not been satisfactory as an inhibitor in acid-gas stripping plants.

U.S. Pat. No. 1,989,004, Fife, teaches using an alkanolamine or mixture of mono-, di- and trialkanolamines in a concentration of 15 to 30 percent in water and less than 1 percent of a soluble metal salt, e.g., copper or nickel sulfate or oxide.

This does not teach maintaining sulfur, that is, elemental or the necessary sulfur compounds and oxidizing agents to produce sulfur atoms.

Fife absorbs the $H_2S$ and organic sulfur compounds from the gas using the complexing activity of each of the components, viz., the amine, the amine-metal complex and the metal. These complexes are nonthermally treated in two steps to release the amine for reuse and convert the sulfur to a solid for removal from the system.

Fife treats the spent solution (aqueous alkanolamine containing the amine-sulfur compound complex and the amine-metal sulfur compound complex) not with heat to regenerate but with air (page 1, column 2, lines 20-38) to oxidize the sulfur compounds (thiosulfates) and sulfates, then the oxidized solution is treated with lime to precipitate the sulfur as calcium sulfate and thiosulfates. It is well known that the alkanolamine also undergoes oxidation and that aeration would increase the loss of alkanolamine as is evidenced by the fact that the 15 to 30 percent amine solution used in Example II (page 2, column 1, lines 49-56) after regeneration constituted only a 10 to 13 percent amine solution, a loss of about 30 percent of the original amine.

U.S. Pat. No. 3,372,981, Ravner, discloses the use of copper to stabilize monoethanolamine solution against degradation during use as an absorbent for $CO_2$ only from air (no $H_2S$ present). Ravner uses iron, copper and a chromium salt but *uses no sulfur*.

U.S. Pat. No. 2,559,580, Alexander, discloses that iodine must be present in an alkanolamine solution in order to prevent degradation of the amine in which copper is present. This reference teaches that copper without iodine degrades amines, column 5, lines 19-59.

U.S. Pat. No. 2,405,672, Reitmeier, teaches the use of dichromates and a metal salt, e.g., zinc, copper, cadmium, mercury, arsenic, etc., in amounts of 2 to 3 percent. The metal salt combines with the $H_2S$ to form an insoluble sulfide which precipitates and is thus available for oxidation by the dichromate. The pH of the reference solution must be controlled to be sure the CuS precipitates so that it is available for reaction with the dichromate to form the sulfur (column 3, line 38 to column 4, line 13). This reference requires no amine.

In recent years, both natural and synthetic gases are being produced which contain high concentrations of $CO_2$ and/or $H_2S$. As the demand for neutral gases increases, the size of the units for treating these gases increases, thus, economically an increase in the concentration of absorbent in the system and/or an increase in the loading on the systems seems desirable. Both of the latter, although most desirable, increase the corrosion in the unit resulting in more frequent unscheduled downtimes for repair of and replacement of major elements.

It is therefore an object of the present invention to provide an inhibitor system for use in equipment in contact with acid-gas environments which reduces the corrosion of the metals of construction of equipment used under the conditions.

It is a further object to provide a process which will reduce the economic loss of plant elements and plant operating down-times between normal annual plant turn-around.

A still further object of the present invention is to provide an inhibitor system which will be effective in gas-sweetening processes at loadings in excess of 0.5 mole of acid-gas per mole of absorbent and/or concentrations of absorbents in the circulating solution in excess of 40 percent, thereby reducing plant size, increasing flexibility to operate with and from various gas sources and reduce environmental impact on the surrounding.

These and other objects will become apparent from the description and claims hereinafter set forth.

BRIEF DESCRIPTION OF INVENTION

In accordance with the present invention, the corrosion of metal, particularly ferrous metal and its alloys, in contact with absorbent solutions of acid-gas stripping (gas-sweetening) plants, is materially reduced or essentially eliminated by maintaining dissolved in the absorbent copper ions in the presence of sulfur atoms, particularly polysulfide moieties, in an environmental state such as to prevent bright copper plating. The quantity of copper ions necessary to reduce corrosion will vary with each plant and may vary from day to day in a particular plant. Therefore, the practical manner for determining the proper quantity of copper ions is to place in the equipment at the points where the most severe corrosion occurs, generally in the reboiler and cross-exchangers to the reboiler, a metal coupon which can be examined periodically, even daily, for signs of bright copper plate and corrosion. Such a control design will be explained and described in detail in the examples. Further, when a plant is first placed on the inhibitor composition of the present invention, be it new or an older plant, a larger quantity of copper must be supplied since much is lost to removing the corrosive elements and corrosion products at the sites corrosion has or is likely to develop. Once a degree of passivation to corrosion has been attained, it has been found that as little as about 15 parts of inhibitor per million parts of absorbent solution will maintain less than 1 mpy corrosion rate. It is to be understood that in most instances where initially high concentrations of inhibitor are required it is common for the inhibitor to eventually passivate the unit by removing the innocuous components and thus enable reduction of inhibitor to more conventional quantities, i.e., in some instances even as low as 1 to 10 ppm. However, even in those instances where corrosion is only slightly reduced, downtimes due to corrosion are minimized and even eliminated between normal plant turn-arounds or shutdowns.

Copper (metal, oxide, hydroxide or salt) of a nature to provide, in situ under the conditions found in a gas treating or conditioning process using thermal regeneration, copper ions and sulfur or a sulfur yielding compound which, under the conditions of operation, viz., particularly the thermal regeneration, will produce sulfur atoms and preferably polysulfide moieties. The copper ions form a copper polysulfide with the copper atoms and polysulfide moieties:

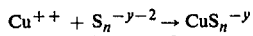

where y is an integer from 2 to 6 and n is an integer from 2 to about 50 which copper polysulfide is available to react from solution with the $Fe^{++}$ in solution to form at the surface of the containers a chalcopyrite, i.e., $CuFeS_2$. The $Fe^{++}$ is the primary product of the cathodic corrosion reaction. Further, in some instances, the copper will be reduced to copper atoms which alloy with the ferrous metal below the chalcopyrite surface layer and form a copper-ferrous alloy. These phenomena provide an effective physical and electrical barrier to the corrosive environment (the alkanolamine, alkanolamine decomposition products, $H_2S$, $CO_2$, $Cu^{+2}$, $S°$, $Fe^{+3}$ and $O_2$); that is, the chalcopyrite acts as a kinetic barrier to the corrosion reactions by hindering the electron and mass transport required to support the anodic and cathodic-corrosion half reactions.

The phenomenon is, of course, based on theoretical concepts supported by the results of surface analysis of the ferrous surfaces of both passivated and corroded surfaces using depth profiling, Auger spectroscopy and the electron microprobe.

The copper ions may conveniently be introduced into an absorbent medium both during and after the initial period as a solution of or by dissolution in said absorbent of sufficient of one of the following to maintain the equivalent of 1 to 15 or more parts of copper per million parts of absorbent medium dissolved in the circulating medium:

I  copper metal when accompanied by sulfur, or an oxidizing agent which will produce sulfur from the $H_2S$ dissolved in said absorbent;

II  copper sulfide (either cupric or cuprous);

III  a copper salt (cupric or cuprous) in combination with an oxidizing agent and if little or no $H_2S$ or COS is present in the acid gas, then sulfur or a sulfur generating compound. The copper salts may be but not limited to cupric or cuprous carbonate, benzoate, stearate, acetate, acetylacetonate, chloride, oxalate, oxide, molybdate, chromate, perchlorate, sulfate or tetrafluoroborate.

It is, of course, understood that the quantity of inhibitor (i.e., the concentration of the components of the inhibitor composition) in the circulating system may be, and oftentimes is, greater than that dissolved. Such a condition will occur during the initial stages of introduction of the inhibitor to a plant or at any upset of the plant or on start-up after any scheduled or unscheduled down-time or turn-around. During these periods, the inhibitor is reacting with the metal of the plant, passivating the sites of corrosion, and reacting with corrosion products to passivate these products; thus, the inhibitor is being consumed. Therefore, the inhibitor components must be present to replace those consumed. And where the solubility of one or more of the components is limited, excess of that component or components must be present to enable reaction and/or dissolution in order to effectively inhibit corrosion. It has been found that initially as much as 500 to 2000 ppm inhibitor must be present to passivate a plant on start-up in order to obtain satisfactory readings on the monitoring coupons. This condition can exist for from several hours to several days depending upon the condition of the plant. Similarly, during operation of a plant which has undergone an upset, it may be necessary to increase the amount of components circulating, dissolved or undissolved, until the monitoring unit indicates a non-corroding condition.

The oxidizing agents which have been found to give satisfactory results when used in combination with one or more of the above sources of copper are: sulfur, potassium permanganate, calcium permanganate, sodium permanganate, potassium persulfate, potassium iodate, calcium iodate, sodium bromate, sodium persulfate, potassium meta periodate, strontium permanganate, sodium perborate, zinc permanganate, hydrogen peroxide, sodium dichromate, potassium dichromate, sodium perborate, sodium peroxide, oxygen.

The absorbents for acid-gas stripping which have been found to be susceptible to use in accordance with the present invention are the alkanolamines having the formula

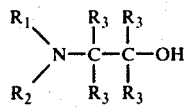

wherein each $R_1$ and $R_2$ represent independently hydrogen, or $-C(R_3)_2C(R_3)_2-OH$ and where $R_3$ represents an independently selected radical of hydrogen or a $C_{1-3}$ alkyl radical. This absorbent may be used alone or in combination with each other or one of the following, also useful, gas-stripping absorbents: sulfolane (tetrahydrothiophene-1,1-dioxide), potassium carbonate or diglycolamines. The presence of hydrogen sulfide ($H_2S$) is required if the inhibitor is to be effective in absorbent systems of potassium carbonate and the dialkanolamines. The inhibitor has limited effectiveness in the presence of $CO_2$ alone in these absorbents. The preferred absorbents are monoethanolamine, diisopropanolamine-sulfolane, diethanolamine, diglycolamine(2-(2-aminoethoxy)ethanol), 3-dimethylamino-1,2-propanediol (Methicol) all as aqueous solutions. It is to be understood that instead of water glycols may be employed.

DETAILED DESCRIPTION OF THE INVENTION

GENERAL PROCEDURE

Various aqueous solutions of monoalkanolamine with or without inhibitors were prepared and the solutions saturated with $H_2S$ at 25° C. Mild steel coupons, pickled in HCl (15 percent) for 30 minutes, rinsed with water, scrubbed with pumice soap and a toothbrush, rinsed first with water, and then with acetone and air dried, were weighed and immersed in the test solutions with or without inhibitor. Then the solution jars were sealed and placed in a pressure vessel and maintained at 120° C. under a pressure which just exceeds the vapor pressure of the stripping solution (absorbent) at the 120° C. temperature used for stripping the acid gases from the absorbent for 15 hours. The metal coupons were removed, pickled for 10 minutes in 10 percent HCl which was inhibited with a commercial acid corrosion inhibitor, scrubbed, rinsed and dried as before. The so-prepared coupons were weighed and the difference in weight converted to corrosion rate in mils penetration per year (mpy). Such a procedure determines the corrosion rate of the solutions on AISI 1010 or 1020 Steel. This test determines whether a compound or mixture of compounds has potential as an inhibitor, e.g. it is a screening test. The coupons are similar to the metal in a freshly cleaned, new plant and thus simulate start-up in such a plant. However, in an operating plant, there is an additional problem of corrosion products which act as a copper sink (absorb copper by chemical-combination), e.g., FeS will rapidly absorb copper ions from solution to form chalcopyrite, $CuFeS_2$, a poor inhibitor.

Solutions, prepared containing various compounds and mixtures of compounds, were tested in accordance with the above General Procedure to determine the effectiveness of the compounds as inhibitors. The results are set forth below:

TABLE I

| | Inhibitor | % Monoethanol Amine in Water | % $H_2S$ | Rate MPY | % Inhibition[1] |
|---|---|---|---|---|---|
| Control 1 | None | 80 | Sat at 25° C. | 74 | — |
| | 1000 ppm $CuCO_3$ 1000 ppm $KMnO_4$ | 80 | Sat at 25° C. | 14 | 81 |
| Control 2 | None | 40 | Sparged 16 hours w/$H_2S$ | 14.4 | — |
| | 0.3 gm. (1000 ppm) $CuCO_3$ 0.3 gm. (1000 ppm) $KMnO_4$ | 40 | Same | 1.1 | 92 |

[1] % inhibition = $\dfrac{\text{corrosion rate in mils penetration per year (MPY) without inhibitor} - \text{corrosion rate in mpy with inhibitor}}{\text{corrosion rate in mpy without inhibitor}} \times 100$ In a similar manner, the following compounds were tested yielding the results set forth in the tables. The numbers under "Percent Inhibition" represent the average results of replicates. The data hereafter presented establishes the utility of many of the copper salts listed as well as the effectiveness of the inhibitors of the present invention to reduce corrosion in various gas treating solutions used commercially. It is to be understood that these data do not define the lower limits of the compositions of the present invention, only the indication that these compositions have utility as a corrosion inhibitor. The lower limits are determined by the test methods later set forth in this application. It will be readily observed, for example, that CuS and S added to maintain about 90 ppm and 45 ppm, respectively, will hold a badly corroded commercial plant whereas most of the data from the laboratory hereafter set forth indicates 100 ppm of any combination usually gives less than 50 percent protection.

TABLE II

| | | 80% Monoethanolamine in Water Saturated with $H_2S$ at R.T. | | | |
|---|---|---|---|---|---|
| Copper | | Oxidizer | | % Inhibition[1] | |
| $Cu_2S$ | 1000 | $KMnO_4$ | 1000 | 84,28 | |
| CuS | 100 | K iodate | 100 | corrosion[2] | |
| CuS | 100 | K persulfate | 100 | corrosion | |
| CuS | 100 | $KMnO_4$ | 100 | corrosion | |
| CuS | 500 | $KMnO_4$ | 500 | 90 | |
| CuS | 1000 | $KMnO_4$ | 1000 | 96 | |
| CuS | 500 | K iodate | 500 | 91 | |
| CuS | 1000 | K iodate | 1000 | 90 | |
| CuS | 500 | K persulfate | 500 | 90,86 | |
| CuS | 500 | K persulfate | 1000 | 92 | |
| CuS | 500 | K persulfate | 100 | 92 | |

TABLE II-continued

80% Monoethanolamine in Water Saturated with H₂S at R.T.

| Copper | | Oxidizer | | % Inhibition[1] |
|---|---|---|---|---|
| CuS | 1000 | Na bromate | 1000 | 93 |
| CuS | 500 | Na bromate | 100 | 93 |
| CuS | 500 | Na chlorate | 1000 | 93 |
| CuS | 500 | Na chlorate | 100 | 93 |
| CuS | 1000 | $H_2O_2$ (30%) | 1000 | 60 |
| Cu oxalate | 1000 | $KMnO_4$ | 1000 | 77,35,95,84 |
| Cu oxalate | 2000 | $KMnO_4$ | 1000 | 95,93 |
| Cu oxalate | 5000 | $KMnO_4$ | 1000 | 93,94 |
| Cu oxalate | 1000 | K persulfate | 2000 | corrosion |
| Cu oxalate | 2000 | K persulfate | 5000 | 94 |
| Cu oxalate | 1000 | $H_2O_2$ (30%) | 5000 | 88,53 |
| Cu oxalate | 2000 | $H_2O_2$ (30%) | 1000 | 85 |
| Cu oxalate | 5000 | $H_2O_2$ (30%) | 1000 | 85 |
| Cu (acetate)$_2$ | 1000 | $KMnO_4$ | 1000 | 91 |
| Cu (acetate) | 1000 | $KMnO_4$ | 1000 | 84 |
| Cu (benzoate)$_2$ | 2000 | $KMnO_4$ | 1000 | 80 |
| $CuB_4O_7$ | 1000 | $KMnO_4$ | 1000 | 85 |
| $CuI(P\phi_3)_4$ | 2000 | $KMnO_4$ | 1000 | 80 |
| $CuI(P\phi_3)_4$ | 1000 | $KMnO_4$ | 1000 | 35 |
| $Cu(CF_3CO_2)_2$ | 1000 | $KMnO_4$ | 1000 | 77 |
| $CuSO_4$ | 1000 | K persulfate | 1000 | 87 |
| $CuSO_4$ | 1000 | Na bromate | 1000 | 3,67,53,28 |
| $CuSO_4$ | 1000 | $KMnO_4$ | 1000 | 66 |
| Cupric chromate | 1000 | $KMnO_4$ | 1000 | 77 |
| Cu stearate | 1000 | $KMnO_4$ | 1000 | 62,20 |
| Cu stearate | 2000 | $KMnO_4$ | 1000 | 81 |
| Cu stearate | 2000 | $KMnO_4$ | 2000 | 85 |
| Cu perchlorate | 1000 | $KMnO_4$ | 1000 | 64 |
| $Cu(BF_4)_2$ | 1000 | $KMnO_4$ | 1000 | 84 |
| Cupric perchlorate | 1000 | $KMnO_4$ | 1000 | 49,75 |
| Cupric perchlorate | 2000 | $KMnO_4$ | 1000 | 74,92 |
| Cupric perchlorate | 5000 | $KMnO_4$ | 1000 | 94,95 |
| Cupric acetylacetonate | 1000 | $KMnO_4$ | 1000 | 58,44 |
| Cuprous acetate | 1000 | $KMnO_4$ | 1000 | 84 |
| $Cu_2O$ | 1000 | Sulfur | 1000 | 49 |
| $Cu_2O$ | 2000 | Sulfur | 1000 | 82 |
| $Cu_2O$ | 1000 | Sulfur | 2000 | 70 |
| $Cu_2O$ | 2000 | Sulfur | 2000 | 75 |
| $CuCO_3$ | 1000 | Sulfur | 1000 | 30,43 |
| $CuCO_3$ | 2000 | Sulfur | 1000 | 77 |
| $CuCO_3$ | 1000 | Sulfur | 2000 | 72 |
| $CuCO_3$ | 2000 | Sulfur | 2000 | 83 |
| $Cu(NO_3)_2$ | 1000 | Sulfur | 1000 | 67,52,62 |
| $Cu(NO_3)_2$ | 1000 | Sulfur | 5000 | 46 |
| $CuCO_3$ | 1000 | $KMnO_4$ | 1000 | 94,81,90,93,92 94,87,87,90,89 93,92,78,52,92 92,76,80,76,98 93,94,93,68 |
| $CuCO_3$ | 1000 | $KMnO_4$ | 2000 | 80 |
| $CuCO_3$ | 1000 | $KMnO_4$ | 5000 | 75 |
| $CuCO_3$ | 1000 | $KMnO_4$ | 500 | corrosion |
| $CuCO_3$ | 1000 | $KMnO_4$ | 100 | corrosion |
| $CuCO_3$ | 1000 | $KMnO_4$ | 50 | 29 |
| $CuCO_3$ | 2000 | $KMnO_4$ | 1000 | 91 |
| $CuCO_3$ | 2000 | $KMnO_4$ | 500 | 92 |
| $CuCO_3$ | 2000 | $KMnO_4$ | 100 | 87 |
| $CuCO_3$ | 2000 | $KMnO_4$ | 50 | 86 |
| $CuCO_3$ | 5000 | $KMnO_4$ | 1000 | 91 |
| $CuCO_3$ | 5000 | $KMnO_4$ | 500 | 90 |
| $CuCO_3$ | 5000 | $KMnO_4$ | 100 | 88 |
| $CuCO_3$ | 5000 | $KMnO_4$ | 50 | 86 |
| $CuCO_3$ | 10000 | $KMnO_4$ | 1000 | 90 |
| $CuCO_3$ | 10000 | $KMnO_4$ | 100 | 89 |
| $CuCO_3$ | 1000 | K persulfate | 1000 | corrosion, 67 |
| $CuCO_3$ | 1000 | K persulfate | 2000 | 80 |
| $CuCO_3$ | 2000 | K persulfate | 1000 | 81 |
| $CuCO_3$ | 2000 | K persulfate | 2000 | 85 |
| $CuCO_3$ | 1000 | K iodate | 1000 | 79 |
| $CuCO_3$ | 1000 | Na bromate | 1000 | 85 |
| $CuCO_3$ | 500 | Na persulfate | 500 | corrosion |
| $CuCO_3$ | 1000 | Na persulfate | 500 | corrosion |
| $CuCO_3$ | 1000 | Na persulfate | 1000 | corrosion |
| $CuCO_3$ | 2000 | Na persulfate | 1000 | 86,83 |
| $CuCO_3$ | 1000 | Na persulfate | 2000 | 84,81 |
| $CuCO_3$ | 2000 | Na persulfate | 2000 | 85,86 |
| $CuCO_3$ | 1000 | Na persulfate | 5000 | 82,80 |
| $CuCO_3$ | 1000 | K meta-periodate | 1000 | 71 |
| $CuCO_3$ | 1000 | Na permanganate | 1000 | 26,74 |
| $CuCO_3$ | 1000 | Na permanganate | 2000 | 33,64 |
| $CuCO_3$ | 2000 | Na permanganate | 1000 | 86,75 |

TABLE II-continued

80% Monoethanolamine in Water Saturated with H₂S at R.T.

| Copper | | Oxidizer | | % Inhibition[1] |
|---|---|---|---|---|
| $CuCO_3$ | 2000 | Na permanganate | 2000 | 81 |
| $CuCO_3$ | 1000 | Sr permanganate | 1000 | 66 |
| $CuCO_3$ | 1000 | Sr permanganate | 2000 | 82,58 |
| $CuCO_3$ | 1000 | Sr permanganate | 5000 | 94 |
| $CuCO_3$ | 2000 | Sr permanganate | 2000 | 96 |
| $CuCO_3$ | 5000 | Sr permanganate | 2000 | 94 |
| $CuCO_3$ | 1000 | Na perborate | 5000 | 68 |
| $CuCO_3$ | 1000 | Zn permanganate | 1000 | 72 |
| $CuCO_3$ | 2000 | Zn permanganate | 1000 | 80 |
| $CuCO_3$ | 1000 | Zn permanganate | 2000 | 59 |
| $CuCO_3$ | 1000 | Ca iodate | 1000 | 75 |
| $CuCO_3$ | 1000 | $NaHSO_3$ | 1000 | corrosion |
| $CuCO_3$ | 1000 | Na chlorate | 1000 | 46, corrosion |
| $CuCO_3$ | 1000 | Na chlorate | 2000 | corrosion |
| $CuCO_3$ | 1000 | $KIO_3$ | 1000 | 26 |
| $CuCO_3$ | 1000 | KI | 1000 | 63,77 |
| | | $KMnO_4$ | 1000 | |
| $CuCO_3$ | 1000 | $H_2O_2$ (30%) | 5000 | 63 |
| $Cu_2O$ | 1000 | K persulfate | 1000 | 18,89 corrosion |
| $Cu_2O$ | 1000 | K persulfate | 2000 | 90 |
| $Cu_2O$ | 1000 | K persulfate | 5000 | 93 |
| $Cu_2O$ | 2000 | K persulfate | 1000 | corrosion |
| $Cu_2O$ | 2000 | K persulfate | 2000 | 89 |
| $Cu_2O$ | 2000 | K persulfate | 5000 | 93 |
| $Cu_2O$ | 1000 | $KMnO_4$ | 1000 | corrosion 92,93,86 |
| $Cu_2O$ | 2000 | $KMnO_4$ | 1000 | 44 |
| $Cu_2O$ | 2000 | $KMnO_4$ | 500 | corrosion |
| $Cu_2O$ | 2000 | $KMnO_4$ | 100 | 38 |
| $Cu_2O$ | 1000 | Ca iodate | 1000 | 87 |
| CuO | 1000 | $KMnO_4$ | 1000 | 85,95,92 |
| CuO | 1000 | Ca iodate | 1000 | 91 |
| CuO | 1000 | K iodate | 1000 | 95 |
| CuO | 1000 | Na permanganate | 1000 | 59 |
| $Cu(NO_3)_2$ | 1000 | Zn permanganate | 1000 | 63 |
| CuO | 1000 | K persulfate | 1000 | 94 |
| CuO | 1000 | Na bromate | 1000 | 92 |
| $Cu(NO_3)_2$ | 1000 | Na dichromate | 1000 | corrosion 40,58 |
| $Cu(NO_3)_2$ | 1000 | Na dichromate | 5000 | 49 |
| $Cu(NO_3)_2$ | 1000 | $Br_2$ | 1000 | corrosion |
| $Cu(NO_3)_2$ | 1000 | $I_2$ | 1000 | 49,15 corrosion |
| $Cu(NO_3)_2$ | 1000 | $I_2$ | 2000 | 6 |
| $Cu(NO_3)_2$ | 1000 | $I_2$ | 5000 | corrosion |
| $Cu(NO_3)_2$ | 1000 | K persulfate | 5000 | corrosion |
| $Cu(NO_3)_2$ | 1000 | K persulfate | 1000 | corrosion |
| $Cu(NO_3)_2$ | 1000 | Na persulfate | 1000 | 42 |
| $Cu(NO_3)_2$ | 1000 | Na persulfate | 5000 | 50 |
| $Cu(NO_3)_2$ | 1000 | Na chlorate | 500 | corrosion |
| $Cu(NO_3)_2$ | 1000 | Na chlorate | 100 | corrosion |
| $Cu(NO_3)_2$ | 1000 | Na chlorate | 1000 | corrosion |
| $Cu(NO_3)_2$ | 1000 | Na chlorate | 5000 | corrosion |
| $Cu(NO_3)_2$ | 5000 | Na chlorate | 5000 | 88 |
| $Cu(NO_3)_2$ | 1000 | La perchlorate | 1000 | corrosion |
| $Cu(NO_3)_2$ | 1000 | Na perborate | 1000 | 41,14 |
| $Cu(NO_3)_2$ | 1000 | Na perborate | 5000 | 15,55 |
| $Cu(NO_3)_2$ | 1000 | Sr permanganate | 1000 | 63 |
| $Cu(NO_3)_2$ | 2000 | Sr permanganate | 2000 | 91 |
| $Cu(NO_3)_2$ | 5000 | Sr permanganate | 2000 | 95 |
| $Cu(NO_3)_2$ | 1000 | Sr permanganate | 2000 | 55,79 |
| $Cu(NO_3)_2$ | 1000 | Sr permanganate | 5000 | 79 |
| $Cu(NO_3)_2$ | 1000 | Na peroxide | 1000 | corrosion |
| $Cu(NO_3)_2$ | 1000 | Periodic acid | 1000 | 20 |
| $Cu(NO_3)_2$ | 1000 | $NH_4$ persulfate | 1000 | 16,24,62 |
| $Cu(NO_3)_2$ | 1000 | $NH_4$ persulfate | 2000 | corrosion |
| $Cu(NO_3)_2$ | 1000 | $NH_4$ persulfate | 5000 | 28 |
| $Cu(NO_3)_2$ | 1000 | K persulfate | 5000 | corrosion |
| $Cu(NO_3)_2$ | 1000 | K persulfate | 5000 | 61 |
| $Cu(NO_3)_2$ | 1000 | $KMnO_4$ | 1000 | 60,59,81,90 |
| $Cu(NO_3)_2$ | 1000 | Ca permanganate | 1000 | 91,68 |
| $Cu(NO_3)_2$ | 1000 | Ca iodate | 1000 | 13 |
| $Cu(NO_3)_2$ | 1000 | K-meta periodate | 1000 | 93,63 |
| $Cu(NO_3)_2$ | 1000 | $H_2O_2$ (80%) | 5000 | 37,53 |
| $Cu(NO_3)_2$ | 1000 | $H_2O_2$ (30%) | 1000 | 68 |
| $Cu(NO_3)_2$ | 1000 | $H_2O_2$ (30%) | 5000 | 37 |
| $Cu(NO_3)_2$ | 1000 | Cu selenate | 1000 | corrosion |
| $Cu(NO_3)_2$ | 1000 | Na chlorate | 1000 | 93 |
| Cupric chromate | 1000 | $KMnO_4$ | 1000 | 77 |
| Cupric | 2000 | $KMnO_4$ | 1000 | 70 |

TABLE II-continued

80% Monoethanolamine in Water Saturated with H₂S at R.T.

| Copper | | Oxidizer | | % Inhibition[1] |
|---|---|---|---|---|
| molybdate | | | | |
| Cu(BF₄)₂ | 1000 | KMnO₄ | 1000 | 84 |
| CuI(Pφ₃)₄ | 1000 | KMnO₄ | 1000 | 35 |
| Copper tungstate | 5000 | KMnO₄ | 1000 | 41 |
| Copper phosphide | 5000 | KMnO₄ | 1000 | 28 |
| CuCl₂ | 1000 | KMnO₄ | 500 | 92 |
| CuCl₂ | 1000 | KMnO₄ | 1000 | 84 |
| CuCl₂ | 1000 | K persulfate | 500 | 92 |
| CuCl₂ | 1000 | K iodate | 500 | 92 |
| CuI₂ | 1000 | KMnO₄ | 1000 | 71 |
| CuBr₂ | 1000 | KMnO₄ | 1000 | 77 |

[1]See Table I
[2]Corrosion means no inhibition, i.e. same or greater corrosion rate as that observed with no inhibitor

EFFECT OF PRESENCE OF OXYGEN

To demonstrate the beneficial effect of the presence of oxygen in the system the following tests were run. Oxygen was bubbled through 120 milliliters of an 80% by volume monoethanolamine solution, containing various inhibitors, which was previously saturated at room temperature with H₂S for ½ hour. A coupon prepared in the manner under General Description was immersed in the solution during the heating part of the test in the usual manner. The corrosion rate (loss of metal per unit time) for each run was compared with the corrosion rate for the solution containing no inhibitor. The results are recorded below as % inhibition:

TABLE III

| | | % Inhibition | |
|---|---|---|---|
| Copper | ppm | w/oxy | w/o oxy |
| Cu(NO₃)₂ | 1000 | 52 | corrosive |
| Cu(NO₃)₂ | 2000 | 89 | — |
| Cu(NO₃)₂ | 5000 | — | corrosive |
| CuS | 1000 | 87 | 91 |
| CuS | 2000 | 23 | — |
| Cu₂O | 1000 | 69, 65 | corrosive |
| Control | None | 0 | 0 |
| CuCO₃ | 1000 | 92 | 84, 0, corrosive |

To demonstrate the effectiveness of the corrosion inhibitor compositions of the present invention in other commercial solvents used in gas-treating plants the following data was collected:

COPPER SALT (CuCO₃ or CuS) PLUS OXIDIZER, (S° OR KMnO₄) IN VARIOUS SOLVENTS USED TO REMOVE ACID GASES FROM GAS STREAMS

PROCEDURE:

The conditions for testing the various solvents, including gas ratios, as volume ratios, are described in the following tables. The saturated solutions, at whatever concentration used, were poured into 4 oz. bottles which had the inhibitor candidates and the 1020 mild steel coupons (prepared as in the general procedure) already weighed and placed in them. The bottles were capped with loose fitting caps and placed in a pressure vessel which was then held at 125° C. with a total pressure of 40 psig of either H₂S, or CO₂ or both, for 16 hrs. All inhibitor components are reported in parts inhibitor component per million parts of absorbent medium.

Solvent used: N-Methyldiethanolamine 45% + water 55%
Gas Loading ratio: 1/5 CO₂/H₂S

| CuCO₃ | KMnO₄ | MPY | % Inhibiton |
|---|---|---|---|
| — | — | 38.5 | 0.0 |
| 1000 | 1000 | 11.2 | 71.0 |
| 1000 | 1000 | 13 | 66.2 |
| 1000 | — | 13.4 | 65.2 |
| 1000 | — | 12 | 68.8 |
| — | 1000 | 61 | −58.5 |

Solvent used: Diisopropanolamine 45%, Sulfolane 35%, Water 20%
Gas Loading ratio: Saturated with H₂S only

| CuCO₃ | KMnO₄ | MPY | % Inhibition |
|---|---|---|---|
| — | — | 18.4 | 0.0 |
| 50 | 50 | 9.85 | 46.4 |
| 50 | 500 | 3.1 | 83.1 |
| 50 | 2500 | 9.0 | 51 |
| 500 | 50 | 5.85 | 68.2 |
| 500 | 500 | 5.56 | 70 |
| 500 | 2500 | 6.14 | 66.6 |
| 2500 | 50 | 8 | 56.5 |
| 2500 | 500 | 7.65 | 58.4 |
| 2500 | 2500 | 5.74 | 68.8 |
| 25 | 25 | 11.1 | 39.7 |
| 5000 | 5000 | 7.46 | 59.4 |

Solvent used: Diglycolamine: (2-(2-aminoethoxy)ethanol) 60% + water 40%
Gas loading ratio: Saturated with H₂S only

| CuCO₃ | KMnO₄ | MPY | % Inhibition |
|---|---|---|---|
| — | — | 20.4 | 0.0 |
| 50 | 2500 | 6.21 | 69.5 |
| 500 | 50 | 2.8 | 86.3 |
| 500 | 2500 | 3.91 | 80.8 |
| 2500 | 50 | 3.19 | 84.3 |
| 2500 | 500 | 3.27 | 84 |
| 2500 | 2500 | 3.1 | 84.8 |
| 5000 | 5000 | 4 | 80.4 |
| 500 | 500 | 3.22 | 83.7 |
| 50 | 50 | 37.5 | −84 |
| 50 | 500 | 28.3 | −39 |

Solvent used: METHICOL: (3-dimethylamino-1,2-propanediol) 50% + water 50%
Gas loading ratio: CO₂ sparged 30 min., H₂S sparged the 20 min. External H₂S gas pressure was applied to the sparkler filter to get its pressure to 40 psig.

| CuCO₃ | KMnO₄ | MPY | % Inhibition |
|---|---|---|---|
| — | — | 25.55 | 0.0 |
| 1000 | 1000 | 9.44 | 63.0 |
| | | 12.0 | 53.0 |
| | | 11.11 | 56.5 |

Solvent used: Catacarb: (potassium carbonate) from Cooperative Farm Chemicals 72-FS-224 as delivered
Gas loading ratio: 50/50 $CO_2/H_2S$ saturated

| $CuCO_3$ | $KMnO_4$ | MPY | % Inhibition |
|---|---|---|---|
| — | — | 27.63 | 0.0 |
| 1000 | 2000 | 12.4 | 55.0 |
| 1000 | 2000 | 17.8 | 35.6 |
| 1000 | 100 | 20.0 | 27.6 |
| 1000 | 1000 | 20.2 | 27.0 |
| 1000 | 1000 | 16.9 | 38.8 |

The following two tables illustrate that a high $CO_2$ content, i.e., $CO_2$ alone or ratios greater than 1 to 1, $CO_2$ to $H_2S$ in potassium carbonate or diethanolamine systems are not effectively inhibited. However, when the $CO_2$ to $H_2S$ ratio is 1 to 1 or less than 1 to 1, e.g., 1/4.5 or $H_2S$ alone, inhibition is effected.

Solvent used: Exxon catacarb (Potassium Carbonate) their sample solution #1 containing no inhibitor
Gas ratio: $CO_2$ only

| CuS | S° | MPY | % Inhibition |
|---|---|---|---|
| — | — | 42 | 0 |
| 3000 | — | 72 | −67 |
| 1000 | — | 58 | −36 |
| 500 | — | 56 | −30 |
| 100 | — | 39 | +8 |
| 3000 | 3000 | 19 | +54 |
| 3000 | 1000 | 105 | −144 |
| 3000 | 100 | 63 | −46 |
| 1000 | 3000 | 54 | −28 |
| 1000 | 1000 | 87 | −104 |
| 1000 | 100 | 52 | −22 |
| 500 | 1000 | 69 | −58 |
| 100 | 500 | 40.5 | +5.7 |
| 100 | 100 | 60.2 | −40 |
| — | 1000 | 42 | 2.2 |
| — | 500 | 80.2 | −86.6 |
| — | 3000 | 29 | 32.5 |
| — | 100 | 46 | −7 |

Gas ratio: 9/1 $CO_2/H_2S$

| $CuCO_3$ | S° | MPY | % Inhibition |
|---|---|---|---|
| — | — | 7 | 0 |
| 3000 | — | 14.7 | −114, −72, |
|  |  | 11.76 | −102 |
|  |  | 13.85 |  |
| 1000 | — | 9.7, 10, | −41, −46, |
|  |  | 15.1 | −120 |
| 500 | — | 9.5, 9.9, | −38.6, −44, |
|  |  | 10.8 | −58 |
| 100 | — | 10.06, 10.8, | −47, −57.6, |
|  |  | 9.81 | −43 |
| 3000 | 3000 | 13.87 | −102 |
|  |  | 15.83 | −130 |
| 3000 | 1000 | 15.1 | −120 |
| 3000 | 500 | 14.13 | −106 |
|  |  | 14.86 | −117 |
| 3000 | 100 | 14.9 | −117 |
|  |  | 13.03 | −90 |
| 1000 | 3000 | 16.33 | −138 |
|  |  | 20.3 | −196 |
| 1000 | 1000 | 17.3 | −152 |
|  |  | 12.8 | −87 |
| 1000 | 500 | 15.04 | −119 |
| 1000 | 100 | 12.9 | −88 |
|  |  | 12.6 | −84 |
| 500 | 3000 | 16.07 | −134 |
| 500 | 1000 | 12.77 | −86 |
|  |  | 14.38 | −110 |
| 500 | 100 | 10.8 | −57 |
| 100 | 3000 | 17.01 | −148 |
|  |  | 17.82 | −160 |
| 100 | 1000 | 14.6 | −113 |
|  |  | 14.75 | −115 |
| 100 | 500 | 16.1 | −135 |
| 100 | 100 | 13.06 | −90.6 |

Solvent used: Diethanolamine: (DEA) 30% + 70% water
Gas ratio: 9/1 $CO_2/H_2S$

| $CuCO_3$ | S° | MPY | % Inhibition |
|---|---|---|---|
| — | — | 9.3 | 0 |
|  |  | 9.09 | 0 |
|  |  | 9.13 | 0 |
| 5000 | — | 17.04 | −86 |
|  |  | 18.5 | −101 |
| 1000 | — | 13.4 | −46 |
|  |  | 12.63 | −38 |
| 500 | — | 12.95 | −41 |
|  |  | 11.04 | −20 |
| 100 | — | 9.44 | −3 |
|  |  | 9.43 | −2.8 |
| 5000 | 5000 | 33.02 | −260 |
|  |  | 33.4 | −264 |
| 5000 | 1000 | 25.3 | −176 |
|  |  | 17.2 | −87.6 |
| 5000 | 100 | 18.7 | −104 |
|  |  | 19.5 | −113 |
| 1000 | 5000 | 26.2 | −185 |
|  |  | 32 | −249 |
| 1000 | 1000 | 19.71 | −115 |
|  |  | 23.3 | −154 |
| 1000 | 500 | 23.2 | −154 |
|  |  | 19.78 | −116 |
| 1000 | 100 | 13.35 | −46 |
|  |  | 13.85 | −51 |
| 500 | 5000 | 27.8 | −205 |
|  |  | 26.3 | −187 |
| 500 | 1000 | 21.4 | −133 |
|  |  | 19.82 | −116 |
| 500 | 500 | 21.8 | −138 |
|  |  | 20.5 | −124 |
| 500 | 100 | 15.7 | −71 |
|  |  | 14.9 | −62 |
| — | 5000 | 36.14 | −294 |
| — | 1000 | 22.4 | −144 |
| — | 500 | 19.9 | −117 |
| — | 100 | 15.11 | −65 |
| 100 | 5000 | 22.76 | −148 |
| 100 | 500 | 26.2 | −186 |

Solvent used: Diethanolamine: (DEA) 40% + 60% water
Gas loading ratio: $CO_2/H_2S$ 1/4.5

| $CuCO_3$ | $KMnO_4$ | MPY | % Inhibition |
|---|---|---|---|
| — | — | 14.35 | 0.0 |
| 25 | 25 | 13.6 | 5.2 |
| 25 | 50 | 16.8 | −17.07 |
| 25 | 100 | 18.96 | −32.1 |
| 25 | 500 | 22.2 | −55 |
| 25 | 1000 | 20.5 | −43 |
| 25 | 2000 | 17.05 | −18.8 |
| 25 | 5000 | 11.6 | 19.2 |
| 500 | 25 | 8.05 | 44.0 |
| 500 | 50 | 8.17 | 43.0 |
| 500 | 100 | 8.19 | 43.0 |
| 500 | 500 | 9.05 | 37.0 |
| 500 | 1000 | 7.91 | 45.0 |
| 500 | 2000 | 8.95 | 37.6 |
| 500 | 5000 | 8.84 | 38.4 |
| 1000 | 50 | 9.27 | 35.4 |
| 1000 | 500 | 12.25 | 14.6 |
| 1000 | 2000 | 11.0 | 23.3 |
| 1000 | 500 | 14.7 | −2.4 |
| 5000 | 50 | 10.1 | 29.6 |
| 5000 | 5000 | 13.6 | 5.2 |
| 1000 | — | 9.55 | 33.4 |
| — | 1000 | 17.2 | −19.8 |

Solvent used: Diethanolamine: (DEA) 80% + 20% water
Gas ratio: Saturated with $H_2S$ only

| $CuCO_3$ | $KMnO_4$ | MPY | % Inhibition |
|---|---|---|---|
| — | — | 17.25 | 0.0 |
| 5000 | — | 6.3 | 63.5 |
| 2000 | — | 6.77 | 60.7 |
| 1500 | — | 6.19 | 64.0 |
| 1000 | — | 5.74 | 66.7 |

-continued

| CuCO$_3$ | KMnO$_4$ | MPY | % Inhibition |
|---|---|---|---|
| 500 | — | 6.75 | 60.9 |
| — | 5000 | 13.6 | 21.1 |
| — | 2000 | 14.3 | 17.1 |
| — | 1500 | 14.06 | 18.5 |
| — | 1000 | 13.64 | 20.9 |
| — | 500 | 13.64 | 20.9 |
| 5000 | 5000 | 6.7 | 61.2 |
| 2000 | 2000 | 6.69 | 61.2 |
| 1000 | 1000 | 5.66 | 67.2 |
| 1000 | 1000 | 5.9 | 65.8 |
| 5000 | 1000 | 7.06 | 59.07 |
| 5000 | 2000 | 7.02 | 59.3 |
| 1000 | 5000 | 6.00 | 65.2 |
| 2000 | 5000 | 6.4 | 63.00 |
| 2000 | 1000 | 6.85 | 60.0 |
| 1000 | 2000 | 6.5 | 62.3 |
| 2000 | 2000 | 4.8 | 72.2 |
| 1000 | 1000 | 5.2 | 69.8 |
| 1000 | 1000 | 4.52 | 73.8 |

Solvent used: Diethanolamine (DEA) 30% + 70% water
Gas ratio: 1/9 $CO_2/H_2S$

| CuCO$_3$ | S° | MPY | % Inhibition |
|---|---|---|---|
| — | — | 35.3 | 0 |
| — | — | 28.12 | 0 |
| — | — | 30.0 | 0 |
| 5000 | — | 18.6 | 40 |
| | | 17 | 45 |
| 1000 | — | 14.18 | 54 |
| | | 13.6 | 56 |
| 500 | — | 11 | 64.6 |
| | | 13.4 | 57 |
| 100 | — | 12.9 | 58.6 |
| | | 18.2 | 41.5 |
| 5000 | 5000 | 21.5 | 31 |
| | | 23.06 | 26 |
| 5000 | 1000 | 20.6 | 34 |
| | | 21.3 | 31 |
| 5000 | 500 | 21 | 31.6 |
| | | 21.4 | 31.3 |
| 5000 | 100 | 18.3 | 41.2 |
| | | 19.2 | 38 |
| 1000 | 5000 | 23.5 | 24.5 |
| | | 25.1 | 19.4 |
| 1000 | 1000 | 17.2 | 44.7 |
| | | 16.4 | 47.3 |
| 1000 | 500 | 16.8 | 46 |
| | | 14.2 | 54 |
| 1000 | 100 | 17.27 | 44 |
| | | 18.2 | 41.5 |
| 500 | 5000 | 39.6 | −27 |
| | | 58.8 | −89 |
| 500 | 1000 | 16.3 | 47.6 |
| | | 20 | 36 |
| 500 | 500 | 14.8 | 52.5 |
| | | 17.7 | 43 |
| 500 | 100 | 13.84 | 55.5 |
| — | 5000 | 105.7 | −239 |
| — | 1000 | 72 | −131 |
| — | 500 | 62.1 | −99 |
| — | 100 | 54 | −73 |

It is apparent from the above data that the copper inhibitor composition of the present invention is not a satisfactory inhibitor for diethanolamine solutions of less than 50 percent diethanolamine when used for sweetening acid-gases high in carbon dioxide content. Similarly the inhibitor composition has limited utility in potassium carbonate solutions of greater than 50 percent $CO_2$. However, as $H_2S$ content increases, the inhibitory effect is apparent.

FIELD TRIAL

An off-gas stripper in a medium size refinery operating at 250° F. on the reboiler and with 17 to 19% aqueous monoalkanolamine absorbent (a 6000 gallon capacity) was seriously corroded and recording 37.4 mpy corrosion rate on an electrical resistance corrosion monitoring probe at the reboiler outlet, 74.6 mpy and 95.5 mpy corrosion rate on coupons at the reboiler outlet and the reboiler cross-exchange, respectively. This rate of corrosion was experienced during a five-day period following a turn-around. On the sixth day, copper sulfide and sulfur were added to the aqueous amine solution continuously at a rate of approximately 50 pounds CuS every 6–8 days and approximately 24 pounds sulfur every day.

Beginning the sixth day of the test, the day the corrosion inhibitor was added, throughout the twelfth day the corrosion rates were 9.75 mpy, 4.77 mpy and 16.08 mpy at the probe at the reboiler outlet and the coupons at the reboiler outlet and reboiler cross-exchanger, respectively. From the twelfth day to the end of the test the corrosion rates were as follows:

| Day | Probe Reboiler Outlet | Coupons Reboiler Outlet | Coupons Cross-Exchanger |
|---|---|---|---|
| 12–14 | 1.85 | 1.26 | 9.44 |
| 19–26 | 1.85 | 1.25 | 14.6 |
| 27–39 | 1 | 10.5 | 13.7 |
| 39–45 | 1 | 4.7 | 18.1 |

On several instances the corrosion rate on the probe was allowed to increase to about 24 mpy by discontinuing the addition of inhibitor, then inhibitor addition resumed. Within one hour after the addition was resumed, the probe registered 1 mpy or less corrosion rate.

In another test using a pilot plant, copper rods were placed in a filter chamber for an alkanolamine gas treating plant. Sulfur dissolved in monoethanolamine was added periodically. The full flow of alkanolamine passed through the filter containing the copper rods in the rich absorbent to the stripper line. The corrosion probes showed passivation during the test, i.e., zero corrosion rate.

TABLE IV

Copper rods in full flow filter. S°/MEA solution added as slugs.

| | Corrosion Rate (MPY) | |
|---|---|---|
| | Hot Lean 1[1] | Hot Lean 2[1] |
| 200 mls S°/MEA | 52.6 | 12.0 |
| 400 mls S°/MEA | 0.0 | 0.0 |
| Depassivate | 0.0 | 14.95 |
| 300 mls S°/MEA | 0.0 | 0.0 |
| Depassivate | 0.0 | 37.0 |

Remove copper rods — only residual copper present in plant.

| | Corrosion Rate (MPY) | | |
|---|---|---|---|
| | Hot Lean 1[1] | Hot Lean 2[1] | Hot Rich 3[2] |
| 300 mls S°/MEA | 0.0 | 0.0 | 0.0 |
| Depassivate | 0.0 | 0.0 | 157.0 |
| 300 mls S°/MEA | 0.0 | 0.0 | 0.0 |
| Depassivate | 0.0 | 0.0 | 181.0 |
| 300 mls S°/MEA | 0.0 | 0.0 | 0.0 |
| Depassivate | 95.0 | 120.0 | 260.0 |
| 200 mls S°/MEA | 95.0 | 120.0 | 260.0 |
| 150 mls S°/MEA | 100.7 | 33.7 | 100.0 |

Passivation was possible for 118 hours after removing copper rods.

[1] Both probes in line from stripper bottom to reboiler.
[2] In line from absorber to top of stripper.

METHODS FOR DETERMINING THE CORROSION RATES AND INHIBITOR EFFECTIVENESS

There are two methods which can be used to measure the corrosion rate and also the effectiveness of the copper based inhibitors of the present invention at various points throughout plants which are using solvents such as monoethanolamine to remove mixtures of acid gases, such as $H_2S$ and $CO_2$, from liquid or gas process streams. The first is by using metal corrosion test coupons. The second is by using a metal resistance probe and an electrical resistance measuring bridge such as that manufactured by Corrosion Monitoring Systems, Inc., 33 Lincoln Rd., Springfield, N.J. 07081. A very good probe, the F. Jefferies probe is especially useful because of its all metal construction and essential freedom from temperature fluctuation sensitivity. This probe is also sold by the above named corporation. Another probe which is also useful is one made by Magna Corporation, who also manufactures a resistance bridge which will measure the corrosion experienced by their probe.

It is not unusual to have different sections of any gas treatment plant made from different metals. Thus, if the corrosion rate of a particular plant section is sought, it is necessary to measure the corrosion on a probe or coupon made of that same alloy which has been placed in the plant at that section.

A convenient coupon test method for mild steel is the one described below. Similar tests are available for other alloys.

First, a coupon of the metal of interest is machined. A convenient size is ½ in. × 2 in. × ⅜ in. A 3/8 in. hole is drilled near one end so that the coupon can be mounted on a coupon holder. This holder is used to place and hold the coupon, in electrical isolation from the plant's base metal, in the plant at the point of interest.

Second, the machined coupon is cleaned as follows

Place the raw metal coupon in a 15% HCl solution. The solution can be in a 2 oz, wide mouth bottle or beaker tall enough so the coupon can lean against the side of the container for support and still be completely covered by the HCl solution. Let the coupon soak in the acid for a half hour, then remove and rinse it with cold water. Next, scrub the coupon with pumice soap (such as Lava) using a toothbrush while holding the coupon in a rubber gloved hand. Use 15–20 strokes per side and edge; then, water and acetone rinse and air dry. Weight the coupon accurately on a balance to a tenth of a milligram and mount on the coupon holder and place it into the plant's solution.

Entry to the corrosive environment is achieved by one of several techniques widely known in the art. One such method is to insert the coupon and its holder through a packing gland and then through an open valve.

Third, after the coupon has been in the corrosive environment for several days, it is removed. The exact number of days is not important except that, in order to be able to place more significance in the measured corrosion rates, times of 20–30 days are desirable; but, times as short as one day can be used. Very short test periods generally result in higher apparent corrosion rates than would be expected from longer time period tests. The coupon is then recleaned according to the following procedure:

Place the corroded metal coupon in 15% HCl solution containing a good acid corrosion inhibitor. Then, follow the same instructions as listed above for the first cleaning of the coupon.

When the coupon is reweighed, subtract to determine the difference in weight from the weight of the untested coupon. The original weight, minus the final weight, will give the weight loss in grams. Convert this to milligrams (by moving the decimal to the right three places).

By using the following method, a corrosion rate for the solution-alloy system can be calculated.

$$CR \ (mpy) = \frac{0.183 \times \text{Wt. Loss (mg)}}{\text{Strip factor} \times \text{Coupon Weight Before (gm)} \times \text{Time (days)}}$$

Where: 0.183 is the conversion factor from milligrams/square decimeter/day (mdd) to mils penetration per year (mpy) for mild steel (1020).

$$\text{Strip Factor} = \frac{\text{Area in Decimeters of Reference Coupon}}{\text{Weight of Reference Coupon in Grams}}$$

Where: for coupons used 0.0176 was strip factor.

Fourth, inhibitor in the way and amount described in accordance with the present invention is added to the plant and a new corrosion rate determined by the method outlined just above.

Fifth, a percent inhibitor is calculated for the particular inhibitor concentration used as follows:

$$\% \ \text{Inhibition} = \frac{\text{Uninhibited Corrosion Rate} - \text{Inhibited Corrosion Rate}}{\text{Uninhibited Corrosion Rate}}$$

Sixth, the amount of inhibitor is increased or decreased to achieve the desired corrosion protection as measured by the coupon method just outlined. Usually, 5 mpy is achievable; but corrosion has been reduced in the hot, corrosive environments from 20 mpy to values less than 1 mpy as measured by this technique which is found to correlate well with plant inspection and measurements made on specific elements by a state licensed boiler inspector.

The corrosion rate of a plant's solution can also be measured by using metal probes such as those described earlier. In this case, the probe is designed to replace the coupon as described above. The probe can be used directly as received from the manufacturer where it was sand-blasted before shipment or it can be cleaned with unihibited HCl as described in the above by the coupon cleaning method.

After the corrosion probe is cleaned, it is inserted into the plant's solution at the location in question and the temperature allowed to equilibrate. A resistance reading is taken with a resistance bridge. The bridge sold by the probe manufacture is very convenient. By drawing a graph of the resistance probe vs. time, the corrosion rate can be calculated from the slope of the line using the formula supplied by the probe manufacturer.

When the inhibited corrosion rate has been determined, inhibitor is added according to the present invention and the corrosion rate is measured and calculations made as above outlined.

What is claimed is:

1. A corrosion inhibiting composition for ferrous metal and its alloys, in contact with acid-gas stripping absorbent solutions selected from the group consisting of alkanolamines having the formula:

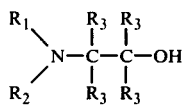

wherein each $R_1$ and $R_2$ represents independently hydrogen, or $-C(R_3)_2C(R_3)_2-OH$ and $R_3$ represents an independently selected radical of hydrogen or $C_{1-3}$ alkyl radical, sulfolane, (tetrahydrothiophene-1,1-dioxide), potassium carbonate or diglycolamines, each alone or in combination with one or more of each other as aqueous solutions or glycol solutions, said compositions consisting essentially of:

(a) a source of copper ion selected from the group consisting of copper metal, copper sulfide and copper salts, (b) a source of sulfur atoms selected from the group consisting of 1) sulfur, or 2) hydrogen sulfide and/or COS in combination with an oxidizing agent which will produce in solution the sulfur atom, at least some of which is the polysulfide, under the conditions of operation in an acid-gas stripping plant which employs thermal regeneration techniques for separating the combined chemisorbed acid-gas from the stripping absorbent, and (c) a solvent for (a) and (b) selected from the afore-enumerated absorbent solutions.

2. A ferrous metal corrosion inhibiting composition consisting of:

(a) copper as the copper metal, copper sulfide or copper salt;

(b) an oxidizing agent which, in the presence of sulfur or a sulfur containing compound, will convert the sulfur to the sulfur atom and/or oxidize copper to the copper ion, and (c) an alkanolamine of the formula:

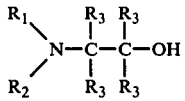

wherein each $R_1$ and $R_2$ represents independently hydrogen, or $-C(R_3)_2C(R_3)_2-OH$ and where $R_3$ represents an independently selected radical of hydrogen or a $C_{1-3}$ alkyl radical.

3. The ferrous metal inhibiting composition of claim 1 consisting of copper metal and a compound yielding sulfur atoms by reaction with an oxidizing agent in solution of an acid-gas stripping absorbent under the conditions of acid-gas stripping and regeneration of stripping absorbent.

4. The ferrous metal corrosion inhibiting composition of claim 1 wherein copper sulfide is the copper source.

5. The ferrous metal corrosion inhibiting composition of claim 1 wherein copper sulfide is the copper source and an oxidizing agent.

6. The inhibitor composition of claim 5 wherein the oxidizing agent is sulfur.

7. A corrosion inhibited acid-gas absorbing composition consisting of an aqueous acid-gas stripping absorbent solution selected from the group consisting of alkanolamines having the formula:

$$R_1 \atop R_2 \!\!\diagup\!\!\!\!\diagdown\!\! N - C(R_3)_2 - C(R_3)_2 - OH$$

wherein each $R_1$ and $R_2$ represents independently hydrogen, or $-C(R_3)_2C(R_3)_2-OH$ and wherein $R_3$ represents an independently selected radical of hydrogen or $C_{1-3}$ alkyl radical, sulfolane, (tetrahydrothiophene-1,1-dioxide), potassium carbonate, or diglycolamines, each alone or in combination with one or more of each other as aqueous solution containing from 1 to 5000 ppm copper and 1 to 5000 ppm sulfur, at least some of which is present as the polysulfide.

8. A corrosion inhibitor composition comprising the composition of claim 6 wherein said medium is an alkanolamine.

9. A corrosion inhibitor composition comprising the composition of claim 1 dissolved in an aqueous gas-absorbing solution selected from the group consisting of potassium carbonate and alkanolamines, having the formula:

$$R_1 \atop R_2 \!\!\diagup\!\!\!\!\diagdown\!\! N - C(R_3)_2 - C(R_3)_2 - OH$$

wherein each $R_1$ and $R_2$ represents independently hydrogen, or $-C(R_3)_2C(R_3)_2-OH$ and where $R_3$ represents an independently selected radical of hydrogen or a $C_{1-3}$ alkyl radical.

10. In the method for removing acid-gases from natural and synthetic gases containing the same by contacting the acid-gas containing gases with a solution of a gas absorbing solution selected from the group consisting of alkanolamines having the formula:

$$R_1 \atop R_2 \!\!\diagup\!\!\!\!\diagdown\!\! N - C(R_3)_2 - C(R_3)_2 - OH$$

wherein each $R_1$ and $R_2$ represents independently hydrogen, or $-C(R_3)_2C(R_3)_2-OH$ and $R_3$ represents an independently selected radical of hydrogen or $C_{1-3}$ alkyl radical, sulfolane, (tetrahydrothiophene-1,1-dioxide), potassium carbonate or diglycolamines, each alone or in combination with one or more of each other as aqueous solutions or glycol solutions, and freeing the medium of the acid-gases by heating, the improvement of which consists of maintaining in solution in said medium the composition of claim 1 thereby to reduce the corrosive attack of the acid-gases on the metallic components of the equipment in which the acid-gas removal and regeneration of medium is carried out.

* * * * *

UNITED STATES PATENT AND TRADEMARK OFFICE
CERTIFICATE OF CORRECTION

PATENT NO. : 4,143,119
DATED : March 6, 1979
INVENTOR(S) : Robert G. Asperger, et al It is certified that error appears in the above-identified patent and that said Letters Patent are hereby corrected as shown below:

Col. 12, line 19; change "% Inhibiton" to --% Inhibition--.

Col. 17, line 34; change "1/2 in. X 2 in. X 3/8 in." to --1/2 in. X 2 in. X 1/16 in.--.

Col. 17, line 49; change "Weight" to -- Weigh --.

Col. 18, line 28; change "inhibitor" to --inhibition--.

Col. 18, line 50; change "unihibited" to --uninhibited--.

Col. 18, line 56; change "manufacture" to --manufacturer--.

Col. 18, line 60; change "inhibited" to --uninhibited--.

Signed and Sealed this

Seventeenth Day of July 1979

[SEAL]

Attest:

Attesting Officer

LUTRELLE F. PARKER
*Acting Commissioner of Patents and Trademarks*